J. F. LAMB.
ELECTRICALLY HEATED DEVICE.
APPLICATION FILED DEC. 19, 1912.
1,060,268.
Patented Apr. 29, 1913.
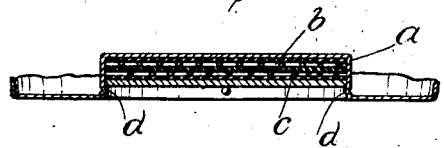
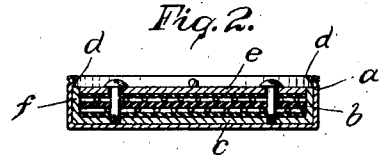
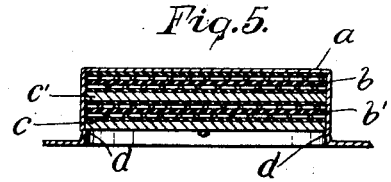
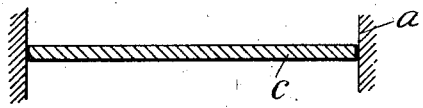
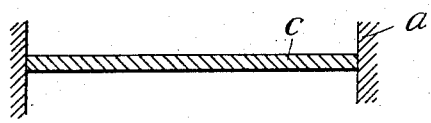
WITNESSES
INVENTOR
Joseph F. Lamb:
ATTORNEY

UNITED STATES PATENT OFFICE.

JOSEPH F. LAMB, OF NEW BRITAIN, CONNECTICUT, ASSIGNOR TO LANDERS, FRARY & CLARK, OF NEW BRITAIN, CONNECTICUT, A CORPORATION OF CONNECTICUT.

ELECTRICALLY-HEATED DEVICE.

1,060,268.  Specification of Letters Patent.  Patented Apr. 29, 1913.

Application filed December 19, 1912. Serial No. 737,670.

*To all whom it may concern:*

Be it known that I, JOSEPH F. LAMB, a citizen of the United States, and a resident of New Britain, in the county of Hartford and State of Connecticut, have invented certain new and useful Improvements in Electrically-Heated Devices, of which the following is a specification.

This improvement consists in combining with a utensil and an electric heater a plate of conducting material in such relation that the heat imparted to the plate by the heater causes it to expand into binding engagement with the utensil. The plate is fitted, in process of manufacture, as well as may be in heat conducting relation to the utensil, and its expansion tends to perfect or make more effectual this heat conducting relation.

I consider it to be essential to the proper working of my invention that those walls of the utensil which receive and tend to resist the expansion of the conducting plate be so disposed that the heat is rapidly absorbed by whatever is being heated, thus keeping the temperature of these walls lower than that of the conducting plate, with the result that the greater expansion of the plate creates the binding engagement and perfects the heat-conducting relation with these walls of the utensil. In fact, this invention finds its most successful embodiment in utensils having socketed walls within which the heater and the conducting plate are located, it being thus surrounded on top and circumferentially by the heat-absorbing material, which keeps its temperature relatively lower than that of the conducting plate.

So far as I know the present practice is to mechanically clamp the heater to the utensil in one way or another to obtain a heating relation, the expansion or distortion of the heater or its parts during the operation of the device tending to destroy this heating relation, rather than to improve it or make it more effectual.

It is the object of this invention to improve upon such constructions in the manner pointed out above.

Two embodiments of the invention have been selected for illustration, though it is to be understood that it is susceptible of various uses and in connection with many different utensils or like devices.

In the drawings Figure 1 is a sectional view of one embodiment. Fig. 2 is a sectional view of another embodiment. Figs. 3 and 4 are views on enlarged scale, showing the operation in some exaggeration. Fig. 5 shows a modification in which a plurality of units are used.

In the structure illustrated, the part denoted by $a$ may be considered as a portion of the utensil, $b$ the heater, and $c$ a plate of heat conducting material located between one side of the heater and the wall of the utensil and in heating relation with both, this plate taking heat from the heater and delivering it to the utensil.

Figs. 3 and 4 show in exaggeration the peculiar and novel arrangement of the parts, and particularly of the plate with reference to the utensil wall, which produces the result of causing the plate, as it expands under heat, to bind itself against the walls of the utensil and thus improve the heat conducting relation over what is customarily provided in the manufacture of the device.

It will be noted that the practice of this invention requires that the plate $c$ be located between opposing walls of the utensil, which may conveniently be, and as illustrated are, the side walls of sockets or indentations in the utensil.

While it may be preferred to secure the heater and conducting plate $c$ in place by passing screws or like devices through them into the utensil wall, any means for holding these parts in position, such as the slight offsets $d, d$, will suffice, the point to be noted being that these are positioning means and not necessarily clamping devices to hold the heater against the utensil wall. When the device is in operation the binding of the plate $c$ against the walls of the utensil holds the heater in proper position.

In Fig. 1 the heater is shown against a wall of the utensil, and the plate $c$ between the exposed side of the heater and the opposing walls of the utensil. This arrangement is particularly advantageous since heat from the exposed side of the heater is conducted to the utensil over a suitable path, and as the edges of the plate are cooler than its central portion, owing to the fact that heat is being absorbed therefrom by the utensil, the heat will flow to its edges in an attempt to equalize the temperature. Thus, the greater part of the heat evolved is utilized, and loss by ineffective dissipation correspondingly reduced.

In Fig. 2 the plate c is shown as interposed between the heater and the utensil wall, and a second plate e located against the exposed part of the heater fits within an edge flange f on the plate c, in order that it may expand into a binding engagement therewith; or the plate e might be enlarged so that it would lie on the edge flange f, and when heated expand into binding engagement with the utensil wall and constitute a path of heat conduction from the exposed side of the heater direct to the utensil.

In Fig. 5 two heaters b′ and b are shown in a socket in the wall of the utensil, and one plate of heat conducting material c′ is interposed between the two heaters, and a second plate c is arranged against the exposed side of the lower heater. These plates are fitted closely within the socket so that their edges are in heat conducting relation therewith, and are caused to expand by the heat evolved, to make this heat conducting relation more effectual.

It will be observed that in all of the embodiments of the invention here illustrated, the heater is practically surrounded by the material or substance which is to be heated, and that in each case the exposed surface of the heater has arranged in heating relation with it a plate of conducting material whose edges are in heating relation with the part to be heated, and that it is the function of this plate to provide a path for the flow of heat in a direction and to a point where it will perform effective work.

Having described my invention in the manner in which it is to be utilized in connection with the embodiments illustrated, it will be apparent to any one skilled in the art how it can be incorporated in other utensils to accomplish the desired results.

I desire it to be clearly understood that the embodiments illustrated have been selected merely for convenience and simplicity in the description and disclosure of the invention, and not with the intention of limiting the scope of the invention as set forth in the appended claims.

I claim as my invention:

1. That improvement in electrically heated devices which comprises the combination with a utensil and an electrical heater formed on a core of insulating material, of a plate of heat conducting material formed separately therefrom and arranged between one side of the heater and a wall of the utensil in heating relation with both, said plate being so fitted to said wall as to produce by its expansion under heat evolved by the heater, binding engagement therewith, whereby the heat conducting relation between the said parts is made more effectual.

2. The combination with a utensil and an electrical heater therefor formed on a core of insulating material, of a heat conducting member formed separately from and arranged in heating relation with the heater, and opposing integral surfaces of the utensil between which said member is fitted, said surfaces being adapted to receive pressure created by the expansion of said member when it is heated and tending to resist that pressure, thereby creating and maintaining more effectual heat conducting relation between said member and the utensil during the operation of the device.

3. The combination with a utensil and an electrical heater therefor formed on a core of insulating material, of a plate of heat conducting material formed separately from the heater and in heating relation with both, said plate being confined in the direction of its greatest expansion between parts of the utensil wall, and normally having a close fit therein, but adapted to expand under the heat evolved in the heater into binding engagement therewith, to create and maintain a more effectual heat conducting relation.

4. The combination with a receptacle having a socket in its wall, of an electrical heater located within said socket in heating relation with a wall of the receptacle and a plate of heat conducting material located within the socket against the exposed surface of the heater and with its edges in heat conducting relation with the side walls of the socket.

5. The combination with a receptacle having a wall indented to form an outwardly-opening socket, of an electrical heater located in said socket in heating relation with the end thereof, and a plate of heat conducting material located within said socket against the exposed side of said heater, closing the mouth of said socket, and with its edges in heat conducting relation with the side walls of the socket.

6. The combination with a receptacle having a wall indented to form an outwardly-opening socket, of a pair of electrical heaters located in the socket, one above the other, a plate of heat conducting material located between and in heating relation with both of said heaters and with its edge in heat conducting relation with the side walls of the socket, and a second plate of heat conducting material located against the exposed surface of one of said heaters and having its edge arranged in heat conducting relation with the side walls of said socket.

JOSEPH F. LAMB.

Witnesses:
 JENNIE C. ANDERSON,
 LEROY H. PAGE.